United States Patent [19]

Haskell

[11] Patent Number: 4,980,205
[45] Date of Patent: Dec. 25, 1990

[54] ANTI-STATIC COMPOSITION AND METHOD FOR APPLYING SAME

[75] Inventor: Malcolm W. Haskell, Delran, N.J.

[73] Assignee: Share Corporation, Milwaukee, Wis.

[21] Appl. No.: 206,559

[22] Filed: Jun. 14, 1988

Related U.S. Application Data

[63] Continuation-in-part of Ser. No. 90,776, Aug. 28, 1987, abandoned.

[51] Int. Cl.$^5$ .......................... B05D 3/00; B05D 1/02
[52] U.S. Cl. ........................ 427/294; 57/901;
427/243; 427/249; 427/296; 427/314; 427/316;
427/378; 427/394.5; 427/421; 252/500
[58] Field of Search .............. 427/294, 296, 316, 314;
427/398.5, 421, 289, 378, 245; 361/212;
252/500; 57/901

[56] References Cited

U.S. PATENT DOCUMENTS

| | | | |
|---|---|---|---|
| 2,375,113 | 5/1945 | Klammt et al. | 427/398.5 |
| 3,771,305 | 11/1973 | Barnea | 57/901 |
| 3,847,838 | 11/1974 | Habu | 252/500 |
| 4,314,308 | 2/1982 | Faulkner | 361/212 |
| 4,454,058 | 6/1984 | Savit | 252/500 |
| 4,537,823 | 8/1985 | Tsang et al. | 427/294 |

Primary Examiner—Janyce Bell
Attorney, Agent, or Firm—Michael, Best & Friedrich

[57] ABSTRACT

A fibrous material, such as fiberglass insulation, is treated to minimize the generation of static electricity when subjected to agitation, such as by sawing, chopping, blowing, etc. during manufacturing, handling and/or installation, by applying an anti-static composition onto a mat of the material during the manufacturing process. The anti-static composition preferably is an aqueous solution containing an active anti-static agent including a nonflammable glycol humectant and two water soluble quaternary ammonium compounds, one serving as the primary anti-static ingredient and the other serving as a corrosion inhibitor and stabilizer. The anti-static composition is sprayed onto the surface of the mat as it travels through the cooling zone and the cooling air drawn through the mat causes the anti-static agent to penetrate through substantially the entire thickness of the mat.

22 Claims, 1 Drawing Sheet

ANTI-STATIC COMPOSITION AND METHOD FOR APPLYING SAME

CROSS-REFERENCE TO RELATED APPLICATION

This is a continuation-in-part of Ser. No. 090,776, filed Aug. 28, 1987 now abandoned.

BACKGROUND OF THE INVENTION

This invention relates to anti-static compositions for fibrous materials, such as fiberglass insulation, and methods to applying same to such materials in mat form.

Fiberglass insulation is a poor dissipator of static electricity. Any mechanical agitation, such as sawing, cutting, chopping, etc., during manufacture, handling and/or installation of fiberglass insulation generates static electricity which is not dissipated for several hours in some cases. Particles of fiberglass with the same electrical charge repel each other and thereby generate a dust which causes not only an unpleasant and unhealthy environment for workers, but also a loss of material.

Anti-static compositions including one or more quaternary ammonium compounds have been used to neutralize static electric charges. Such a composition is disclosed in U.S. Pat. No. 4,314,308. Many of these compositions tend to be toxic, inflammable and/or corrosive, particularly when exposed to hot glass particles.

Prior attempts have been made to apply anti-static compositions to fiberglass mats during the manufacturing process at the forming end of the production line. However, these attempts generally have been unsuccessful because the resulting mat did not retain anti-static properties.

SUMMARY OF THE INVENTION

An object of the invention is provide an anti-static composition which can be applied to a fibrous material, such as fiberglass insulation, and is capable of providing the material with a long-lasting ability to dissipate static electrical charges.

Another object of the invention is to provide a method for applying an anti-static composition to a mat of fibrous material, such as fiberglass insulation, during the manufacturing process and in a manner whereby the material retains the ability to dissipate static electrical charges for relatively long time periods even though subjected to mechanical agitation.

Other objects, aspects and advantages of the invention will become apparent to those skilled in the art upon reviewing the following detailed description, the drawing and the appended claims.

The anti-static composition provided by the invention is an aqueous solution containing as the active anti-static agent two water soluble quaternary ammonium compounds, one containing an inorganic anion and serving as the primary anti-static ingredient and the other containing an nitrate or nitrite which serves as an corrosion inhibitor and a stabilizer. The active anti-static agent also includes a glycol humectant. The anti-static agent preferably also contains a sufficient amount of a non-corrosive acid to adjust the pH of the composition to about 5 to about 7 and a sufficient amount of a suitable dye to impart a discernable coloration to the composition.

In a preferred embodiment, the anti-static composition is sprayed in atomized form onto the top surface of a fiberglass insulation mat after it has passed through the curing oven and as it moves through the cooling zone in the manufacturing process. The cooling air being drawn through the warm mat assists in causing the anti-static composition to penetrate through substantially the entire thickness of the mat. When the mat is subsequently agitated, such as by sawing, chopping, blowing, etc., generation of static electricity which causes dusting is substantially reduced by the presence of the anti-static agent in the mat material.

DESCRIPTION OF PREFERRED EMBODIMENTS

Figures 1, 2:
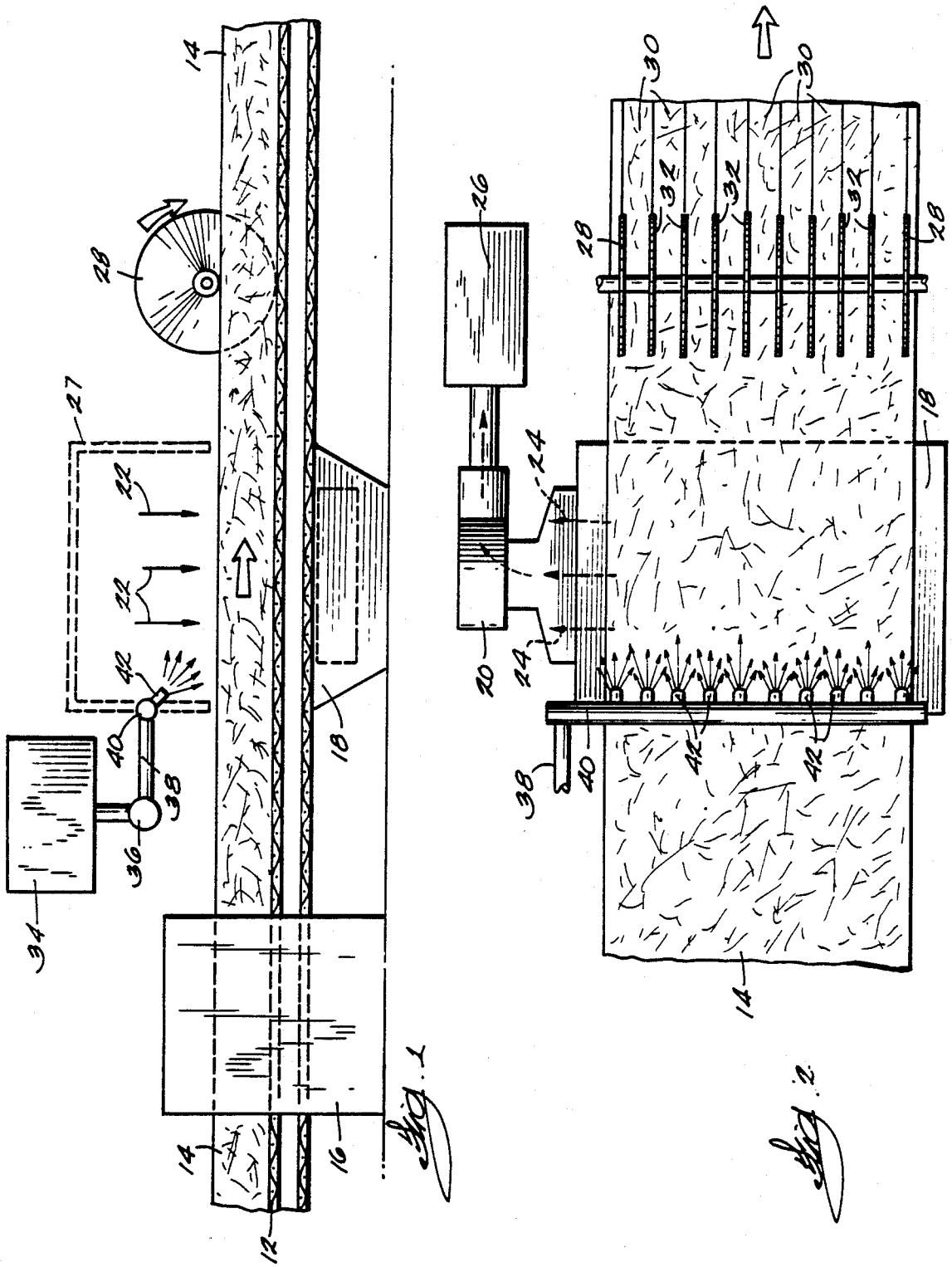
FIG. 1 is a schematic representation of a portion of a production line for fiberglass insulation mat illustrating a system for applying an anti-static composition during the manufacturing process.
FIG. 2 is a top view of the mat production line and application system illustrated in FIG. 1.

While the anti-static composition of the invention can be used on various types and forms of materials to inhibit generation of and/or dissipate static electrical charges, it is particularly adaptable for use on fiberglass insulation for application during the manufacture of fiberglass insulation in mat form and will be described in connection with that application.

The drawings are schematic representations of a portion of a conventional fiberglass insulation mat-forming line. Molten glass is fiberized into filaments which are sprayed into a continuously moving forming/carrier chain 12. The glass filaments fall onto the moving chain 12 in a random fashion to form a mat 14. The glass fiberizing rate and the traveling speed of the chain 12 determine the thickness of the mat which is usually in the order of 10 to 15 inches.

A suitable bonding agent, such as an urea resin, a phenolic resin, etc., is sprayed onto the glass filaments to bind them together and make the mat 14 resilient and resistant to compression. The bonding agent is heated to a temperature of 120° F. or more for curing as the mat passes through a curing oven 16. After the mat 14 exits from the curing oven 16, it travels over a cooling table 18 including one or more induced draft fans 20 which draw or pulls air down through the warm fiberglass mat as illustrated by arrows 22 to expedite cooling. The warm air exiting from the mat (indicated by arrows 24) is routed to suitable dust recovery equipment 26 for removal of fiberglass particles and other particulate material before being exhausted to the atmosphere. As illustrated by the dashed lines in FIG. 1, the cooling table can include a hood 27.

After the cooled mat leaves the cooling table 18, the ragged edges are trimmed by edge trimming saws 28 and slit into bats 30 of the desired width by a plurality of laterally spaced slitter saws 32. A horizontal saw (not shown) can be used to cut the mat to a desired thickness. The saws can be circular saws as illustrated or band saws. The physical contact between the saws 28 and 32 and the fiberglass generates static electricity. The edge trimming results in waste which is usually chopped into nodules and blown through duct work for packaging. The static electricity generated by the trimming and slitting saws causes the surrounding area to become laden with small dust-like particles, resulting not only in an unpleasant and unhealthy working environment but also a loss of material. The static electricity generated by mechanical agitation during chopping of the waste materials can cause the resulting nodules to cling to the wall of the blower plenum and cause plugging.

In accordance with a preferred embodiment of the invention, a liquid anti-static composition, atomized into mist-like form, is sprayed downwardly onto the top surface of the mat 14 at a location near the entry of the cooling table 18. The cooling air assists in drawing the fine droplets of the anti-static composition down into the mat 14.

In the specific embodiment illustrated, the anti-static composition is drawn from a storage tank 34 by a suitable pump 36 and pumped through a conduit 38 into a generally horizontal manifold 40 extending transversely above and across the width of the mat 14 near the entry of the cooling table 18. Connected to the manifold 40 is a plurality of laterally spaced, external air atomizing spray nozzles 42 which direct a fine mist-like spray of the anti-static composition over the surface of the mat 14. Air for atomizing is supplied to the nozzles through a suitable manifold and hoses (not shown) or the like connected to a suitable source of compressed air (not shown).

The spray angle of the nozzles 42 is adjusted to provide thorough surface coverage of the mat and to maximize penetration of the anti-static composition into the mat. This spray angle, which is usually about 30° to 45° from the vertical, varies depending on the travel speed of the mat, mat thickness, cooling air flow and mat composition. The nozzles preferably are situated so that the spray patterns are centered on locations corresponding to the saws.

Various suitable anti-static compositions are capable of imparting electrical charge dissipation properties to the fiberglass mat can be used. The preferred anti-static composition is an aqueous solution containing an active anti-static agent including, based on the total weight of said anti-static agent, about 90 to about 97 weight % of a first water soluble quaternary ammonium compound having the general formula $$\left[\begin{array}{c} R_2 \\ | \\ R_1-N-R_3 \\ | \\ R_4 \end{array}\right]^{+} X^{-}$$

wherein $R_1$ is a substituted or unsubstituted aliphatic group containing 8 to 15 C atoms, $R_2$, $R_3$ and $R_4$ is an aliphatic group containing 1 or 2 carbon atoms, and X is an inorganic anion;

about 1 to about 3 weight % of a second water soluble quaternary ammonium compound having the general formula $$\left[\begin{array}{c} R_6 \\ | \\ R_5-N-R_7 \\ | \\ R_8 \end{array}\right] Y^{-}$$

wherein $R_5$ is a substituted or unsubstituted aliphatic group containing 16 to 24 C atoms, $R_6$, $R_7$ and $R_8$ is a substituted or unsubstituted aliphatic group containing 1 or 2 C atoms, and Y is nitrate or nitrite; and about 1 to about 5 weight % of a glycol having humectant properties.

Both the first and second quaternary ammonium compounds are water soluble. While both can be cationic, anionic or nonionic, cationic compounds presently are preferred because they provide a more rapid dissipation of static electrical charges.

The first quaternary ammonium compound serves as the primary anti-static ingredient. While compounds having higher or lower molecular weights can be used, those having a molecular weight within the range of about 150 to about 400 are preferred.

As indicated in the formula above, the $R_1$ group in the first quaternary ammonium compound can be substituted or unsubstituted aliphatic or cyclic containing 8 to 15 C atoms. Suitable substituents include $$-\overset{\overset{\displaystyle C}{\|}}{O}-,\ -O-,\ -\overset{\overset{\displaystyle O}{\|}}{C}-NH_2-$$

and $-CNH_2-$. The $R_1$ group can be branched or straight chain. Preferably it is an alkane, but can be an alkene aliphatic with unsaturation such as ethylenic unsaturation.

Representative cyclic $R_1$ groups include cycloalkyl, cycloalkenyl or aromatic groups such as phenyl or benzyl.

X can be any inorganic anion which results in the quaternary ammonium compound being water soluble. Suitable anions include chloride, bromide, fluoride, iodide, nitrate, sulfate and phosphate. Chloride and bromide are preferred because of cost considerations.

Suitable first quaternary ammonium compounds containing cyclic $R_1$ groups include compounds which are a mixture of n-alkyl dimethyl benzyl ammonium chlorides and n-alkyl dimethyl ethylbenzyl ammonium chlorides.

Quaternary ammonium compounds containing alkyl $R_1$ groups are preferred. A particularly suitable, commercially available alkyl type compound is CHEMQUAT C-33W, marketed by Chemax, Inc., which is a 33% aqueous solution of cocotrimethyl ammonium chloride.

The amount of the first quaternary ammonium compound in the active anti-static agent is about 90 to about 97, preferably about 93 to about 96 weight %, based on the total weight of the active anti-static agent.

The second quaternary ammonium compound also is an anti-static agent. However, it also serves as a corrosion inhibitor by virtue of the nitrate or nitrite anion and its low volatility stabilizes the composition in the event the composition contacts a hot glass fragment in the mat during application, which can occur quite often during normal production.

The $R_5$ group in the second quaternary ammonium compound can be the same as the $R_1$ group in the first quaternary ammonium compound, except it contains 16 to 24 carbon atoms. The $R_5$ group preferably is a substituted or unsubstituted aliphatic group. While compounds having higher and lower molecular weights can be used, ones having a molecular weight within the range of about 300 to about 600 are preferred.

A particularly suitable, commercially available compound including a substituted aliphatic $R_5$ group is CYASTAT S N, marketed by American Cyanamide Co., which is 50% solution of stearamidopropyl dimethyl-$\beta$-hydroxyethyl ammonium nitrate in a 25% isopropyl alcohol-water mixture.

The amount of the second quaternary ammonium compound in the active anti-static agent is about 1 to about 5, preferably about 2 to about 3 weight %, based on the total weight of the anti-static agent.

The glycol serves as a humectant. That is, it increases the humidity or moisture content on the surface of the fiberglass filaments, thereby increasing the humidity or moisture content within the fiberglass mat which assists in the dissipating static electrical charges. The glycol used should be nonflammable at the temperature of the mat and hot glass fragments therein when the mat reaches the cooling table. Suitable glycols include propylene glycol, ethylene glycol and hexylene glycol. Propylene glycol is preferred because it is non-toxic and a food-approved humectant.

The active anti-static agent preferably includes a sufficient amount of an acid, preferably an inorganic acid, to adjust the pH to about 5 to about 7 which assists in preventing precipitation of the small amount of free amines normally present in the quaternary ammonium compounds. Precipitation of these amines can cause plugging of the spray nozzles. While other suitable acids can be used, sulfuric acid presently is the most preferred because it is not corrosive at pH within the range of 5 to 7.

A sufficient amount of a compatible dye to impart a discernible coloration to the anti-static composition preferably is used so that the composition will not be mistaken for water or another clear liquid. Also, the coloration helps users in finding the fluid level in a container. Generally, a trace amount, e.g. about 0.0001 weight % based on a total weight of the active anti-static agent, is sufficient for this purpose. A particularly suitable commercially available dye is PYLAKLOR DETERGENT BLUE marketed by Pylam Products.

When applied by spray nozzles as in the illustrated embodiment, the viscosity of the anti-static composition is adjusted by diluting with sufficient water to permit atomization into fine, mist-like droplets. Generally, the amount of the aqueous anti-static composition sprayed onto the mat contains about 2 to about 50, preferably about 4 to about 7 weight % of the active anti-static agent, based on the total weight of the anti-static composition.

The amount of anti-static composition sprayed onto the mat is that which is effective to provide the fiberglass material with the ability to dissipate static electrical charges, preferably to a negative charge no less than $-3,000$ volts. Generally, the amount applied is equivalent to at least 25, preferably 150 to 1,000, parts of the active anti-static agent per million parts of the mat material. The feed rate at which the anti-static composition is pumped into the manifold is regulated, depending on the thickness and thus the weight of the mat, to provide the desired dosage of the anti-static agent.

The cooling air drawn through the mat can be controlled so that the anti-static composition penetrates through substantially the entire thickness of the mat. The flow of the cooling air should be regulated so that the air exiting from the bottom of the mat is not entrained with the anti-static composition.

The active ingredients of the anti-static agent usually remain in the mat material and provide effective dissipation of static electrical charges for several months, even when the edge trimmings and other waste material is chopped into nodules. For applications where a cooling table is not available, the same type of penetration can be obtained by drawing air through material to which the anti-static composition is being applied.

The application of the anti-static composition during manufacturing provides several advantages. Visible dust around the machinery downstream of the cooling table, particularly the cutting saws, is substantially reduced. This not only improves industrial hygiene but reduces the loss of material. That is, dust particles, which otherwise would become airborne because of a large negative charge, remain as part of the mat rather than ending up in a dust collection system where they cannot be used. Since the active anti-static ingredients remain in the fiberglass material for several months, generation of dust is minimized when the fiberglass insulation is installed in buildings, either as bats or by blowing chopped material. Also, it has been found that the life of cutting saws is increased when the preferred anti-static composition is applied to the mat. While not fully understood at this time, it appears that the anti-static agent forms a protective surface coating on the saw blades. The wear life of saw blades is increased from 2 or 3 days up to as much as a month, depending on the type of fiberglass.

The anti-static composition also can be used with bulk fiberglass materials by applying directly to the material or spraying into equipment at locations where static electricity is normally generated, e.g., in the plenum of blowers for packaging equipment.

Without further elaboration, it is believed that one skilled in the art, using the preceding description, can utilize the present invention to its fullest extent. The following example is presented to exemplify a preferred embodiment of the invention and should not be construed as a limitation thereof.

EXAMPLE

A test was run on a fiberglass mat Production line including edge trimming saws, slitter saws and a horizontal saw, to evaluate the effectiveness of an anti-static composition of the invention. The atmospheric conditions were relatively humid and cool and, therefore, not conducive to producing high amounts of dust and static electricity. The anti-static agent used in this test contained 95 weight % CHEMQUAT C-33W, 2 weight % CYASTAT SN, 3 weight % propylene gylcol, a trace of PYLAKOR DETERGENT BLUE dye to provide a blue coloration and a sufficient amount of sulfuric acid to reduce the pH to 5. The anti-static agent was diluted by adding 7 parts of water to 1 part of the anti-static agent to produce an anti-static composition for spraying onto the mat.

Six Binks Model 610 external air atomizing nozzles were installed above the mat at locations near the entry of the cooling table. Air was supplied to the nozzles through two ⅜ inch hoses. The spray patterns of the nozzles were centered on locations corresponding to the position of the edge trimming and slitter saws and the nozzles were set to deliver the anti-static composition at a feed rate equivalent to about 500 parts of the anti-static agent per million parts of the mat.

Observations were made of the visual dust present prior to application the anti-static composition and during a 1½ hour period after application began. Measurements of the static electrical charges were made at approximately 30 minute intervals with a 3M Model 703 static meter on both sides of the mat (a) at the oven exit, (b) at the edge trim saw exit and (c) at the horizontal saw exit during the same time period. There was a substantial reduction (estimated to be 60-70% or more) in the visual dust present in the area surrounding the saws throughout the test period. The voltage measurements are tabulated in Table I below.

TABLE I

| | Voltage Readings | | |
|---|---|---|---|
| | Oven Exit | Edge Trim Saw Exit | Horizontal Saw Exit |
| Before Application of Anti-Static Comp. | | | |
| Side 1 | −500 | −5,000 | −50,000 |
| Side 2 | −500 | −5,000 | −50,000 |
| 30 Minutes After Start of Test Period | | | |
| Side 1 | −500 | −400 to −500 | −1,000 to −2,500 |
| Side 2 | −500 | −400 to −500 | −700 to −1,900 |
| At End of Test period | | | |
| Side 1 | −500 | −400 to −500 | −1,500 to −2,500 |
| Side 2 | −500 | −300 to −400 | −1,900 to −2,500 |

From these test results, it can be seen that the use of an anti-static composition of the invention substantially reduced the static electrical charges generated by the edge trimming saw and the horizontal saw. Generally, dusts do not become a problem as long as the static electrical charge is maintained less negative than about −3,000.

Tests performed during less humid atmospheric conditions have shown even a more dramatic reduction in the visual dust and the static electrical charges. In other tests, the edge trimmings were chopped in a hammermill and voltage measurements made on the chopped material at the exit of the hammermill. It was found that the static electrical charge on this material was in the range of −500 to −1,500.

From the foregoing description, one skilled in the art can easily ascertain the essential characteristics of the invention and, without departing from the spirit and scope thereof, make various changes and modifications to adapt it to various usages.

I claim:

1. A method for manufacturing a fiberglass mat in which fiberized glass filaments are bonded together by a heat curable binder and the mat is subsequentially and sequentially passed through a heating zone to cure the binder, a cooling zone including an entrance and means for drawing air through the mat to cool the mat and then through a cutting zone wherein the mat is cut into bats of a predetermined width, the improvement comprising:
spraying an effective amount of a liquid anti-static composition in atomized form onto the surface of said mat near the entrance of the cooling zone whereby the air drawn through said mat in the cooling zone assists in causing said anti-static composition to penetrate through substantially the entire thickness of said mat.

2. A method according to claim 1 wherein the amount of said anti-static composition sprayed onto the surface of said mat is equivalent to at least about 25 parts of said anti-static agent per million parts of said mat.

3. A method according to claim 2 wherein the amount of said anti-static composition sprayed onto the surface of said mat is equivalent to about 150 to about 1000 parts of said anti-static agent per million parts of said mat.

4. A method according to claim 1 wherein said anti-static composition comprises
an aqueous solution containing, based on the total weight of said composition, about 2 to about 50 weight % of an active anti-static agent, said active anti-static agent including, based on the total weight of said active anti-static agent,
about 90 to about 97 weight % of a first water soluble quaternary ammonium compound having the general formula

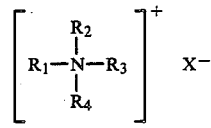

wherein
$R_1$ is a substituted or unsubstituted aliphatic or cyclic group containing 8 to 15 C atoms,
$R_2$, $R_3$ or $R_4$ is an aliphatic group containing 1 or 2 carbon atoms, and
X is an inorganic anion;
about 1 to about 5 weight % of a second water soluble quaternary ammonium compound having the general formula

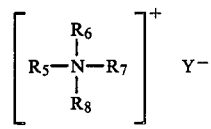

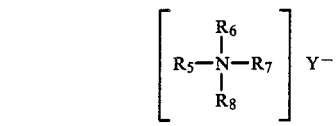

wherein
$R_5$ is a substituted or unsubstituted aliphatic or cyclic group containing 16 to 24 C atoms,
$R_6$, $R_7$ and $R_8$ is a substituted or unsubstituted aliphatic group containing 1 or 2 C atoms, and
Y is nitrate or nitrite; and
about 1 to about 5 weight % of a glycol having humectant properties.

5. A method according to claim 4 wherein said anti-static composition includes a sufficient amount of an inorganic acid to adjust the pH of said composition within the range of about 5 to about 7.

6. A method according to claim 4 wherein the amount of said anti-static composition sprayed onto the surface of said mat is equivalent to at least about 25 parts of said anti-static agent per million parts of said mat.

7. A method according to claim 6 wherein amount of said anti-static composition sprayed onto the surface of said mat is equivalent to about 150 to about 1,000 parts of said anti-static agent per million parts of said mat.

8. A method according to claim 4 wherein said glycol is propylene glycol.

9. A method according to claim 8 wherein X is Chloride or bromide and Y is nitrate.

10. A method according to claim 9 wherein said first quaternary ammonium compound is cocotrimethyl ammonium chloride and said second quaternary ammonium compound is stearamidopropyl dimethyl-β-hydroxyethyl ammonium nitrate.

11. An anti-static composition comprising an aqueous solution containing, based on the total weight of said composition, about 2 to about 50 weight % of an active anti-static agent active said anti-static agent including, based on the total weight of said active anti-static agent, about 90 to about 97 weight % of a first water soluble quaternary ammonium compound having the general formula

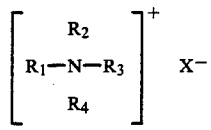

wherein
R₁ is a substituted or unsubstituted aliphatic or cyclic group containing 8 to 15 C atoms,
R₂, R₃ and R₄ is an aliphatic group containing 1 or 2 carbon atoms, and
X is an inorganic anion;

about 1 to about 5 weight % of a second water soluble quaternary ammonium compound having the general formula

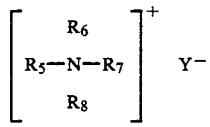

wherein
R₅ is a substituted or unsubstituted aliphatic or cyclic group containing 16 to 24 C atoms,
R₆, R₇ and R₈ is a substituted or unsubstituted aliphatic group containing 1 or 2 C atoms, and
Y is nitrate or nitrite; and about 1 to about 5 weight % of a glycol having humectant properties.

12. An anti-static composition according to claim 11 including a sufficient amount of a compatible dye to impart a discernible coloration to said composition.

13. An anti-static composition according to claim 11 including a sufficient amount of a non-corrosive acid to adjust the pH within the range of about 5 to about 7.

14. An anti-static composition according to claim 13 wherein said acid is sulfuric acid.

15. An anti-static composition according to claim 11 wherein R₁ is a branched or straight chained aliphatic group.

16. An anti-static composition according to claim 15 wherein R₁ is a saturated alkyl group.

17. An anti-static composition according to claim 11 wherein R₅ is a branched or straight chained group.

18. An anti-static composition according to claim 17 wherein at least one of said R₁ and R₅ groups include at least one substituent selected from the group consisting of

19. An anti-static composition according to claim 11 wherein X is chloride, bromide, fluoride, iodide, nitrate, sulfate or phosphate.

20. An anti-static composition according to claim 19 wherein X is chloride or bromide.

21. An anti-static composition according to claim 11 wherein said glycol is propylene glycol.

22. An anti-static composition according to claim 11 wherein said first quaternary ammonium compound is cocotrimethyl ammonium chloride and said second quaternary ammonium compound is stearamidopropyl dimethyl-β-hydroxyethyl ammonium nitrate.

* * * * *

UNITED STATES PATENT AND TRADEMARK OFFICE
CERTIFICATE OF CORRECTION

PATENT NO. : 4,980,205
DATED : December 25, 1990
INVENTOR(S) : Malcolm W. Haskell It is certified that error appears in the above-identified patent and that said Letters Patent is hereby corrected as shown below:

Column 8, lines 43-49, delete formula.

Column 9, lines 22-28, delete formula and insert the following:

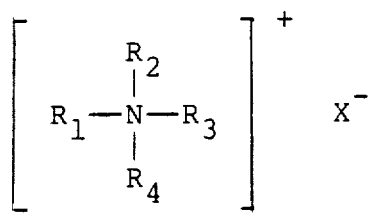

UNITED STATES PATENT AND TRADEMARK OFFICE
CERTIFICATE OF CORRECTION

PATENT NO. : 4,980,205
DATED : December 25, 1990
INVENTOR(S) : Malcolm W. Haskell It is certified that error appears in the above-identified patent and that said Letters Patent is hereby corrected as shown below:

Column 9, lines 39-45, delete formula and insert the following:

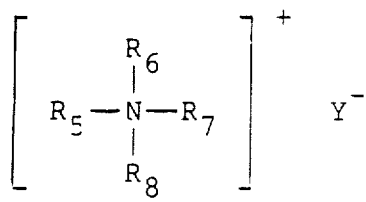

Signed and Sealed this

Second Day of June, 1992

Attest:

DOUGLAS B. COMER

Attesting Officer

Acting Commissioner of Patents and Trademarks